US010392027B2

(12) United States Patent
Chiba

(10) Patent No.: US 10,392,027 B2
(45) Date of Patent: Aug. 27, 2019

(54) DRIVING ASSISTANCE CONTROL APPARATUS

(71) Applicant: DENSO CORPORATION, Kariya, Aichi-pref. (JP)

(72) Inventor: Kunihiko Chiba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/745,964

(22) PCT Filed: Jul. 11, 2016

(86) PCT No.: PCT/JP2016/070447
§ 371 (c)(1),
(2) Date: Jan. 18, 2018

(87) PCT Pub. No.: WO2017/014093
PCT Pub. Date: Jan. 26, 2017

(65) Prior Publication Data
US 2018/0208211 A1 Jul. 26, 2018

(30) Foreign Application Priority Data
Jul. 21, 2015 (JP) .................. 2015-144036

(51) Int. Cl.
*B60W 50/08* (2012.01)
*B60W 50/14* (2012.01)
(Continued)

(52) U.S. Cl.
CPC .......... *B60W 50/082* (2013.01); *B60W 30/14* (2013.01); *B60W 50/08* (2013.01);
(Continued)

(58) Field of Classification Search
CPC .... B60W 50/082; B60W 30/14; B60W 50/08; B60W 50/14; B60W 2050/146; G05D 1/0061; G05D 1/0088; G08G 1/16
(Continued)

(56) References Cited

U.S. PATENT DOCUMENTS

2006/0212207 A1 9/2006 Sugano et al.
2010/0179715 A1* 7/2010 Puddy .................. G05D 1/0061
701/23
(Continued)

FOREIGN PATENT DOCUMENTS

JP H06-298108 A 10/1994
JP H06-336170 A 12/1994
(Continued)

*Primary Examiner* — Marthe Y Marc-Coleman
(74) *Attorney, Agent, or Firm* — Knobbe, Martens, Olson & Bear, LLP

(57) ABSTRACT

A user interface unit alternately designates an automatic switching mode, a manual-on mode, and a manual-off mode. A determining unit determines whether or not execution of driving assistance is permitted at a current time, based on a predetermined determination index related to whether or not execution of driving assistance is possible. A control unit executes a driving assistance mode when the execution of driving assistance is permitted and executes a manual driving mode when the execution of driving assistance is determined to not be permitted, under a condition that the automatic switching mode is designated. The control unit executes the driving assistance mode when a switch for designating the manual-on mode is operated, under a condition that the execution of driving assistance is permitted. The user interface unit does not receive input that designates the manual-on mode when the execution of driving assistance is determined to not be permitted.

11 Claims, 4 Drawing Sheets

● : INDICATOR-OFF STATE

☼ : INDICATOR-ILLUMINATED STATE

(51) Int. Cl.
 *G05D 1/00* (2006.01)
 *B60W 30/14* (2006.01)
 *G08G 1/16* (2006.01)

(52) U.S. Cl.
 CPC ........... *B60W 50/14* (2013.01); *G05D 1/0061* (2013.01); *G05D 1/0088* (2013.01); *G08G 1/163* (2013.01); *G08G 1/166* (2013.01); *B60W 2050/146* (2013.01)

(58) Field of Classification Search
 USPC .......................................................... 701/23
 See application file for complete search history.

(56) References Cited

U.S. PATENT DOCUMENTS

| | | | |
|---|---|---|---|
| 2012/0046817 A1* | 2/2012 | Kindo | B60W 30/143 701/23 |
| 2014/0018993 A1 | 1/2014 | Kindo et al. | |
| 2014/0156133 A1* | 6/2014 | Cullinane | B60W 30/00 701/23 |

FOREIGN PATENT DOCUMENTS

| | | |
|---|---|---|
| JP | 2006-290328 A | 10/2006 |
| JP | 2007-196809 | 8/2007 |
| JP | 2012-51441 A | 3/2012 |
| JP | 4973687 B2 | 7/2012 |
| JP | 2014-108771 | 6/2014 |

\* cited by examiner

● : INDICATOR-OFF STATE

☼ : INDICATOR-ILLUMINATED STATE imagesUS 10,392,027 B2

DRIVING ASSISTANCE CONTROL APPARATUS

CROSS-REFERENCE TO RELATED APPLICATIONS

The present application is based on and claims the benefit of priority from Japanese Patent Application No. 2015-144036, filed on Jul. 21, 2015, the descriptions of which are incorporated herein by reference.

TECHNICAL FIELD

The present disclosure relates to a driving assistance control apparatus that automatically performs a driving operation related to traveling of a vehicle.

BACKGROUND ART

Conventionally, a technology related to driving assistance in which a driving operation related to traveling of a vehicle is automatically performed in place of a driver is known (for example, refer to PTL 1). PTL 1 describes a technology in which switching is performed between a manual traveling mode and an automatic traveling mode based on an operation by a driver. In the manual traveling mode, traveling is performed based on operations by the driver. In the automatic traveling mode, traveling is performed by automatic control.

CITATION LIST

Patent Literature

[PTL 1] Japanese Patent Publication No. 4973687

SUMMARY OF INVENTION

Technical Problem

In the conventional technology described in PTL 1, switching is performed between the manual traveling mode and the automatic traveling mode based on an operation by the driver. In this regard, introduction of a technology in which a system autonomously switches between the manual traveling (or also referred to as manual driving) mode and the automatic traveling (or also referred to as driving assistance) mode based on the state of an own vehicle and peripheral environment can be considered.

As an advantage for enabling autonomous switching between the manual driving mode and the driving assistance mode, reduction of load placed on the driver can be given. In addition, enabling autonomous delegation of authority over driving to the driver, even in cases in which the driver is unaware that a circumstance in which continuation of driving assistance is difficult has occurred during execution of the driving assistance mode, can also be given as an advantage. Here, a system that provides both a function for performing switching between the manual driving mode and the driving assistance mode based on an operation by the driver, and a function for performing automatic switching, and also enables the driver to freely use these functions is desired.

An object of the present disclosure is to provide a technology that provides both a function for performing switching between a manual driving mode and a driving assistance mode based on an operation by a driver, and a function for performing automatic switching, and also enables the driver to freely use these functions.

Solution to Problem

According to an aspect of the present disclosure, a driving assistance control apparatus that includes a control unit, a user interface unit, and a determining unit is provided. Reference numbers within the parentheses in the claims indicate corresponding relationships with specific means according to an embodiment described hereafter as an aspect, and do not limit the technical scope of the present disclosure.

The control unit alternately switches between a driving assistance mode and a manual driving mode. The driving assistance mode is an operation mode in which driving assistance is performed. In driving assistance, a portion or all of driving operations related to traveling of an own vehicle are automatically performed. The manual driving mode is an operation mode in which traveling is performed based on a driving operation by a driver without driving assistance being performed.

The user interface unit is configured to alternately designate, by input from the driver, an automatic switching mode, a manual-on mode, and a manual-off mode. In the automatic switching mode, switching between the driving assistance mode and the manual driving mode is autonomously performed. In the manual-on mode, the driving assistance mode is designated to be turned on by input from the driver. In the manual-off mode, the driving assistance mode is designated to be turned off by input from the driver.

The determining unit determines whether or not execution of driving assistance is permitted at a current time, based on a predetermined determination index related to whether or not execution of driving assistance is possible.

The control unit executes the driving assistance mode when the execution of driving assistance is permitted by the determining unit and executes the manual driving mode when the execution of driving assistance is determined to not be permitted by the determining unit, under a condition that the automatic switching mode is designated by the user interface unit. In addition, the control unit executes the driving assistance mode when a switch for designating the manual-on mode is operated by the user interface unit, under a condition that the execution of driving assistance is permitted by the determining unit. The user interface unit does not receive input that designates the manual-on mode when the execution of driving assistance is determined to not be permitted by the determining unit.

According to an aspect of the present disclosure, the driver can freely operate, through the user interface unit, the manual-on/off mode in which switching between the manual driving mode and the driving assistance mode is performed based on an operation by the driver, and the automatic switching mode in which switching is automatically performed. In addition, in a state in which the execution of driving assistance is determined to not be permitted, the manual-on mode is not received. As a result, the driving assistance mode is prevented from being started in unsuitable circumstances. Consequently, in a system in which both the manual-on/off mode and the automatic switching mode are provided, both safety and convenience of the driver can be actualized.

BRIEF DESCRIPTION OF DRAWINGS

The above-described object, other objects, characteristics, and advantages of the present disclosure will be clarified through the detailed description below, with reference to the accompanying drawings. In the drawings.

DESCRIPTION OF EMBODIMENTS

An embodiment of the present disclosure will hereinafter be described with reference to the drawings. The present disclosure is not limited to the embodiment described below and may be carried out by various modes.

[Description of a Configuration of a Vehicle Traveling Control System]

A configuration of a vehicle traveling control system 1 according to the present embodiment will be described with reference to FIG. 1. The vehicle traveling control system 1 is a system that controls automatic driving in which a driving operation, such as acceleration, steering, or braking, of an own vehicle is automatically performed, as an example of driving assistance in the present disclosure.

Figure 1:
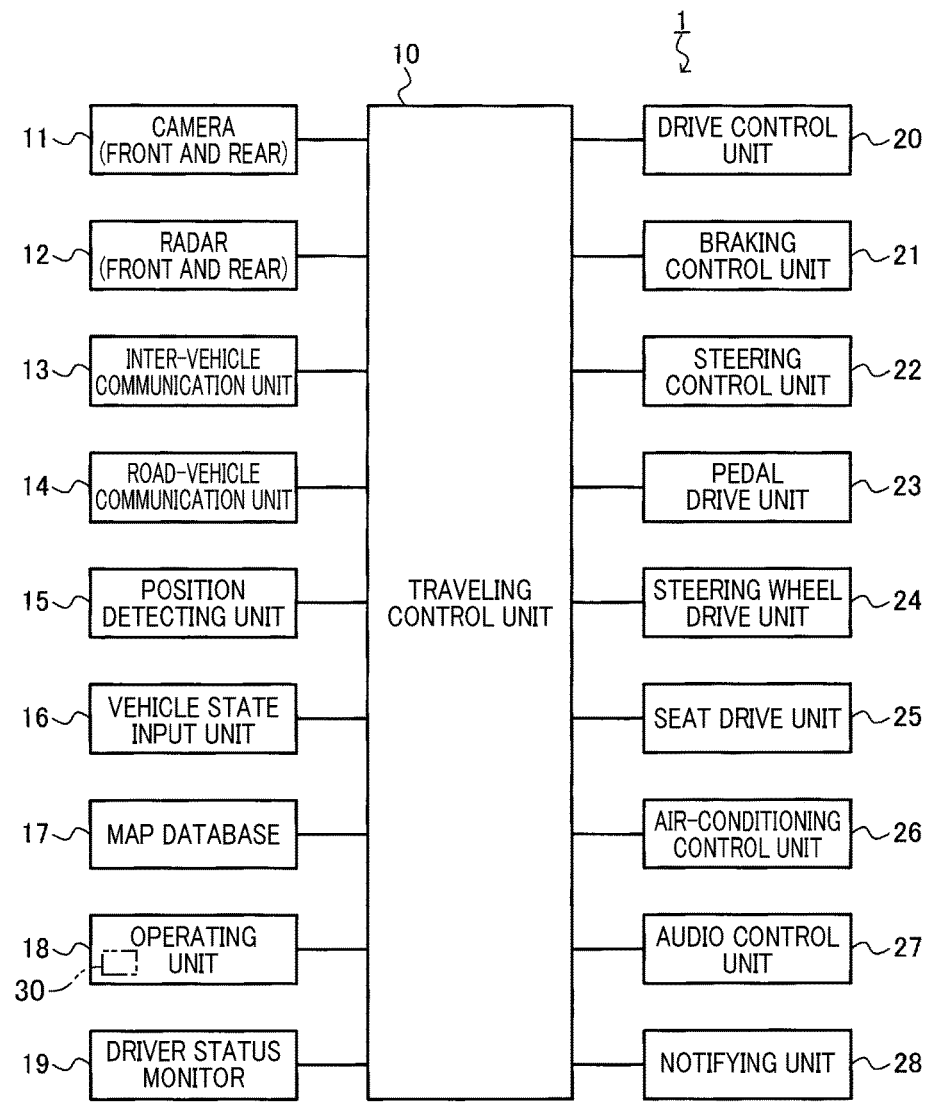
FIG. 1 is a block diagram showing a configuration of a vehicle traveling control system according to an embodiment of the present disclosure.

As shown as an example in FIG. 1, the vehicle traveling control system 1 is configured by a traveling control unit 10 and units that are connected to the traveling control unit 10. Cameras (front and rear) 11, radars (front and rear) 12, an inter-vehicle communication unit 13, a road-vehicle communication unit 14, a position detecting unit 15, a vehicle state input unit 16, a map database 17, an operating unit 18, a driver status monitor 19, a drive control unit 20, a braking control unit 21, a steering control unit 22, a pedal drive unit 23, a steering wheel drive unit 24, a seat drive unit 25, an air-conditioner control unit 26, an audio control unit 27, and a notifying unit 28 are connected to the traveling control unit 10.

The traveling control unit 10 is an information processing apparatus that is mainly configured by a central processing unit (CPU), a read-only memory (ROM), a random access memory (RAM), an input/output interface, and the like (none shown). The traveling control unit 10 controls an automatic driving function for making an own vehicle travel by automatically performing a driving operation, such as acceleration, braking, or steering, of the own vehicle. Automatic driving herein includes making the own vehicle travel to a designated destination in a completely automatic manner. In addition, for example, automatic driving also includes traveling to which driving assistance that carries out a portion of driving operations related to traveling of the own vehicle, such as a traffic lane deviation prevention assistance function (lane keeping assist system) and an inter-vehicle and traffic lane control function (adaptive cruise control), is applied. The traveling control unit 10 corresponds to a control unit and a determining unit of a driving assistance control apparatus.

The traveling control unit 10 makes the own vehicle travel along a route to a destination while comparing a current location of the own vehicle and road map data. In addition, the traveling control unit 10 determines peripheral conditions through the cameras 11, the radars 12, the inter-vehicle communication unit 13, and the road-vehicle communication unit 14, and determines acceleration, braking, and steering operations required for safe traveling. The peripheral conditions include other traffic, such as peripheral vehicles, traffic lights, signs, road shape, and obstacles. Then, the traveling control unit 10 makes the own vehicle travel by operating various types of actuators of the drive control unit 20, the brake control unit 21, the steering control unit 22, and the like based on the determined operation. According to the present embodiment, as a function that is actualized by the traveling control unit 10, control in which switching is performed between an automatic driving mode and a manual driving mode will be described. The automatic driving mode is an operation mode in which automatic driving is performed. The manual driving mode is an operation mode in which the own vehicle travels based on driving operations by the driver, without automatic driving being performed.

The cameras 11 are imaging apparatuses that are respectively set in the front and rear of the vehicle. The cameras 11 capture images of a frontward area and a rearward area of the own vehicle, and output data of the captured images to the traveling control unit 10. The radars 12 are sensors that transmit radio waves or laser light towards respective detection-target areas ahead of and to the rear of the own vehicle, and detect whether or not a target is present and a distance to the target by receiving reflected waves of the radio waves or laser light. According to the present embodiment, use of the cameras 11 and the radars 12 as optical or electromagnetic sensors for recognizing other vehicles and obstacles present ahead of and to the rear of the own vehicle, the road shape, and the like is assumed.

The inter-vehicle communication unit 13 is a wireless communication apparatus that performs wireless communication (inter-vehicle communication) with an onboard communication apparatus that is mounted in another vehicle. The traveling control unit 10 performs inter-vehicle communication with a peripheral vehicle that is present within a wireless communication-possible range of the inter-vehicle communication unit 13 and acquires various types of information related to the peripheral vehicle. According to the present embodiment, an application in which a position and behavior, such as speed, acceleration, and advancing direction, of a peripheral vehicle are determined based on the information acquired from another vehicle by the inter-vehicle communication unit 13 is assumed.

The road-vehicle communication unit 14 is a wireless communication apparatus for receiving vehicle detection information provided by a vehicle state detection apparatus (roadside apparatus) that is set on a road. According to the present embodiment, an application in which a position and behavior, such as speed, acceleration, and advancing direction, of each vehicle present in a peripheral monitoring-target area are detected by the roadside apparatus and the vehicle detection information related to each vehicle is provided by wireless communication is assumed. The traveling control unit 10 determines the position and behavior of each vehicle traveling in the periphery based on the vehicle detection information received from the roadside apparatus by the road-vehicle communication unit 14.

The position detecting unit 15 detects the current location of the own vehicle based on a detection result from a global positioning system (GPS) receiver, a gyro sensor, a vehicle speed sensor, or the like (none shown), and outputs the detected current location information to the traveling control unit 10.

The vehicle state input unit 16 inputs various types of information indicating a vehicle state to the traveling control unit 10. According to the present embodiment, as the information indicating the vehicle state, a measurement value from a sensor that measures behavior, such as speed, acceleration, or angular velocity, of the own vehicle, a state of a vehicle system (recognition and determination system, and traveling control system), an operating signal of a steering wheel operation, an accelerator operation, a brake operation, or the like by the driver, and the like are assumed. The vehicle state input unit 16 corresponds to an operation detecting unit of the driving assistance control apparatus.

The map database 17 is a storage apparatus that stores therein map data for route guidance. The map data includes various types of data, such as node data corresponding to a road node, link data corresponding to a road segment between nodes, attribute data corresponding to nodes and links, and facility data.

The operating unit 18 is a user interface for inputting an operating command for the vehicle traveling control system 1 from the driver. The operating unit 18 provides a function of an automatic driving switching switch 30 for designating a switching method for the automatic driving mode and the manual driving mode. The operating unit 18 corresponds to a user interface unit of the driving assistance control apparatus, together with the automatic driving switching switch 30. Hereafter, details of the automatic driving switching switch 30 actualized by the operating unit 18 will be described with reference to FIG. 2.

Figure 2:
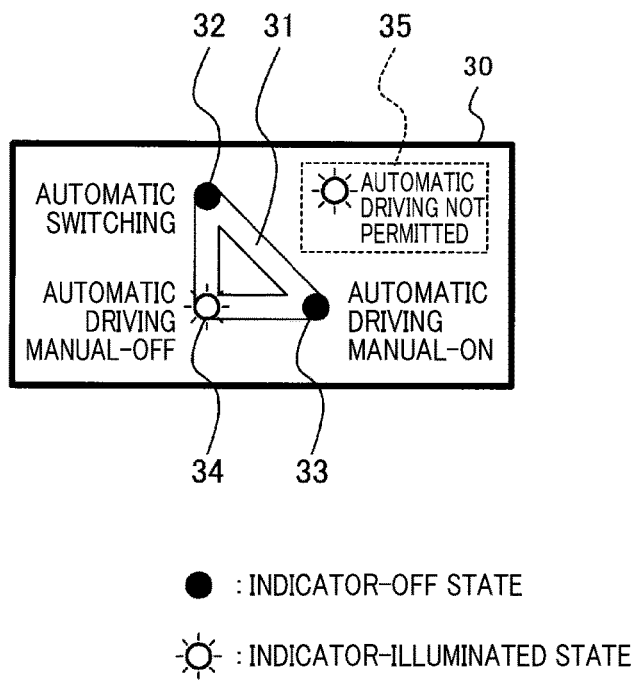
FIG. 2 is an explanatory diagram showing a configuration of an automatic driving switching switch that configures an operating unit in FIG. 1.

For example, the automatic driving switching switch 30 shown as an example in FIG. 2 is assumed to be configured by a graphical user interface (GUI) that is displayed on a display and an operating device that operates in cooperation with the GUI. As the operating device of the GUI, a touch panel for operation by direct contact with the display of the GUI, a remote operating device for in-hand operation of a remotely displayed GUI, and the like are given as examples.

As shown as an example in FIG. 2, a triangular-shaped switch unit 31 is provided in a center portion of the automatic driving switching switch 30. Indicator switches 32, 33, and 34 are provided at vertex portions of the triangular shape of the switching unit 31. The indicator switches 32, 33, and 34 respectively correspond to three operation modes that are an automatic switching mode, an automatic driving manual-on mode, and an automatic driving manual-off mode. The indicator switches 32, 33, and 34 each function as both a switch for selecting the mode and an indicator that displays an on/off state of the switch. The switch unit 31 is controlled such that, as a result of any of the indicator switches being indicated via the operating device, the indicator switch is illuminated and the operation mode is switched to the corresponding mode. In addition, the other indicator switches are turned off.

The indicator switch 32 is a switch that corresponds to the automatic switching mode. The automatic switching mode is an operation mode in which the traveling control unit 10 autonomously switches between the automatic driving mode and the manual driving mode. The indicator switch 33 is a switch that corresponds to the automatic driving manual-on mode. The automatic driving manual-on mode is an operation mode in which the automatic driving mode is turned on by a command from the driver. The indicator switch 34 is a switch that corresponds to the automatic driving manual-off mode. The automatic driving manual-off mode is an operation mode in which the automatic driving mode is turned off and the manual driving mode is turned on by a command from the driver. These indicator switches 32, 33, and 34 correspond to a driving assistance state presenting unit of the driving assistance control apparatus.

In addition, a state display area 35 is provided in an upper right portion of the automatic driving switching switch 30. Information related to an execution state of automatic driving and an indicator that is illuminated based on information content are displayed in the state display area 35. The state display area 35 corresponds to the driving assistance state presenting unit of the driving assistance control apparatus.

Returning to the description of the block diagram in FIG. 1, the driver status monitor 19 is configured by an in-cabin camera and sensors for observing a state of the driver. According to the present embodiment, for example, as the state of the driver to be observed by the driver status monitor 19, movement of eye gaze, state of wakefulness, strength of grip on the steering wheel, and the like are assumed.

The drive control unit 20 is a control apparatus that includes an actuator that operates an accelerator and a transmission of the own vehicle. The traveling control unit 10 controls acceleration and deceleration of the own vehicle by sending a control command to the drive control unit 20 based on a traveling plan that is calculated based on the state of the own vehicle and its periphery.

The brake control unit 21 is a control apparatus that includes an actuator that operates the brake of the own vehicle. The traveling control unit 10 controls braking of the own vehicle by sending a control command to the brake control unit 21 based on the traveling plan that is calculated based on the state of the own vehicle and its periphery.

The steering control unit 22 is a control apparatus that includes an actuator that operates a steering apparatus of the own vehicle. The traveling control unit 10 controls steering of the own vehicle by sending a control command to the steering control unit 22 based on the traveling plan that is calculated based on the state of the own vehicle and its periphery.

The pedal drive unit 23 is an actuator that operates a brake pedal of the vehicle. According to the present embodiment, an application in which, when the traveling control unit 10 switches from the automatic driving mode to the manual driving mode, the driver is alerted by the brake being operated via the pedal drive unit 23 is assumed.

The steering wheel drive unit 24 is an actuator that presents tactile force and physical force information that work on a hand of the driver via the steering wheel of the own vehicle. According to the present embodiment, an application in which, when the traveling control unit 10 switches from the automatic driving mode to the manual driving mode, the driver is alerted by the tactile force information being presented to the driver via the steering wheel drive unit 24 is assumed.

The seat drive unit 25 is an actuator that presents tactile force and physical force information that works on the body of the driver via the driver's seat of the own vehicle. According to the present embodiment, an application in which, when the traveling control unit 10 switches from the automatic driving mode to the manual driving mode, the driver is alerted by the tactile force and physical force information being presented to the driver via the seat drive unit 25 is assumed.

The air-conditioner control unit 26 is an electronic control apparatus that controls an air-conditioner of the own vehicle. According to the present embodiment, an application in which, when the traveling control unit 10 switches from the automatic driving mode to the manual driving mode, the driver kept alert by air-conditioning being moderately controlled (such as changes in temperature and air volume, or a change in scent) via the air-conditioner control unit 26 is assumed.

The audio control unit 27 is an electronic control apparatus that controls audio equipment of the own vehicle. According to the present embodiment, an application in which, when the traveling control unit 10 switches from the automatic driving mode to the manual driving mode, the driver is alerted by control, such as sound volume adjustment of reproduced sound of the audio or output of an audio message, being performed via the audio control unit 27 is assumed.

The notifying unit 28 is an output apparatus for notifying the driver of various types of information. For example, the notifying unit 28 is actualized by a display apparatus that displays an image or an audio output apparatus that outputs audio information.

[Description of a Switching Process]

Steps in a switching process performed by the traveling control unit 10 will be described with reference to a flowchart in FIG. 3.

At step S100, the traveling control unit 10 starts the switching process in accompaniment with startup of the vehicle. At step S102, the traveling control unit 10 turns on the manual driving mode and transitions to a driver in-charge operation mode. Immediately after the startup of the vehicle, the automatic driving manual-off mode is set and an automatic driving not-permitted state is displayed in the state display area 35 as an initial state of the automatic driving switching switch 30 (see FIG. 4 by (a)).

Figure 3:
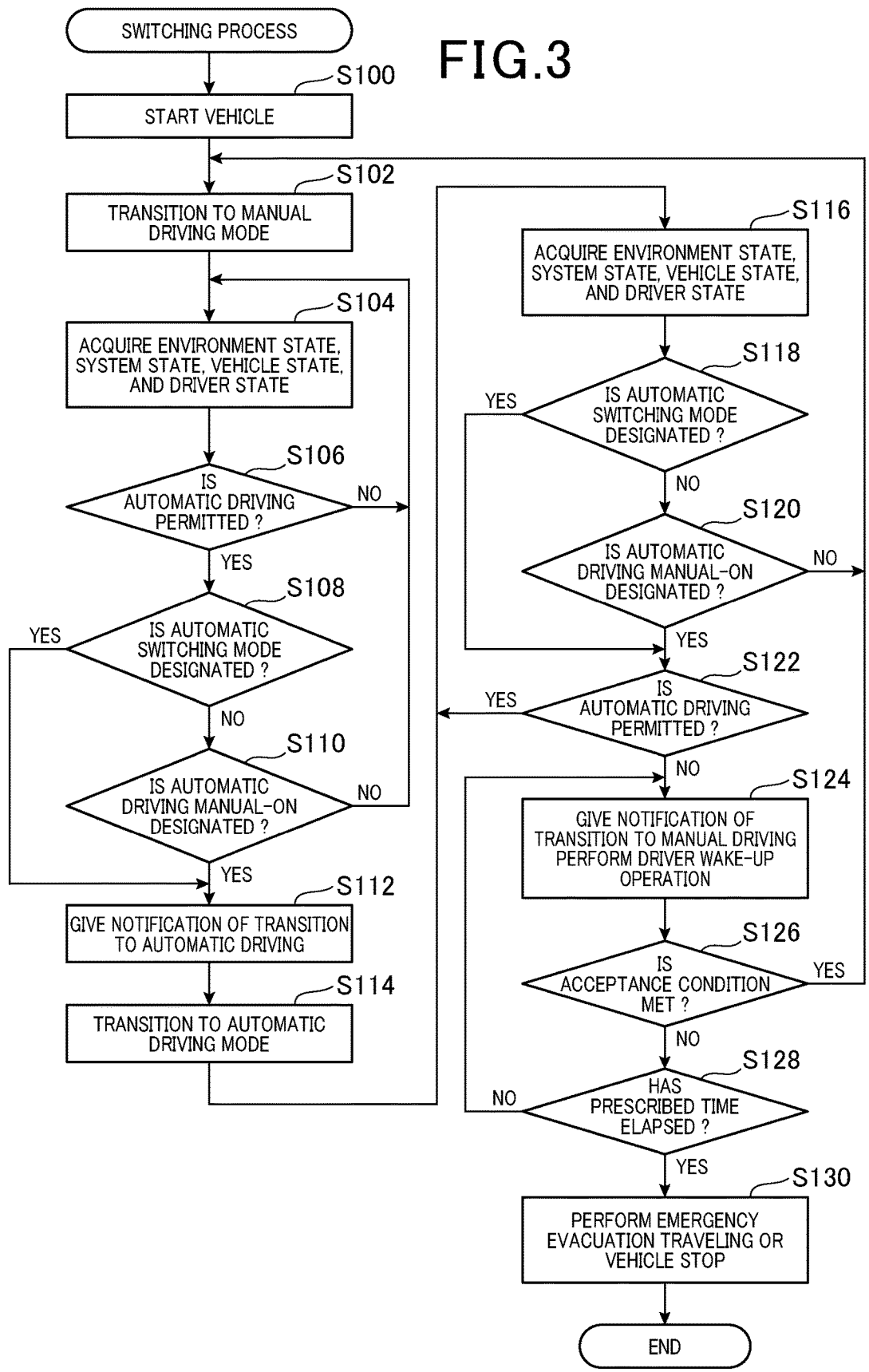
FIG. 3 is a flowchart showing steps in a switching process by a traveling control unit in FIG. 1.

Returning to the description of the flowchart in FIG. 3, at step S104, the traveling control unit 10 acquires various types of information related to an environment state, a system state, a vehicle state, and a driver state. Specifically, as the information related to the environment state, the traveling control unit 10 acquires information indicating peripheral conditions including other traffic, such as peripheral vehicles, traffic lights, signs, the road shape, and obstacles, based on the information acquired from the cameras 11, the radars 12, the inter-vehicle communication unit 13, and the road-vehicle communication unit 14. In addition, as the information related to the system state, the traveling control unit 10 acquires information indicating a state, such as whether or not an abnormality is present, of a vehicle system, that is, a recognition and determination system or a traveling control system that is inputted from the vehicle state input unit 16.

Furthermore, as the information related to the vehicle state, the traveling control unit 19 acquires information indicating the position and behavior of the own vehicle, and operating information regarding a steering wheel operation, an accelerator operation, or a brake operation by the driver that are inputted from the vehicle state input unit 16. Moreover, as the information related to the driver state, the traveling control unit 10 acquires information indicating the movement of eye gaze, the state of wakefulness, the strength of grip on the steering wheel, and the like, of the driver based on the information inputted from the driver status monitor 19.

At step S106, the traveling control unit 10 determines whether or not execution of the automatic driving mode is permitted, using the various types of information acquired at step S104 as determination indexes. Specifically, for example, regarding the traveling environment surrounding the own vehicle, the traveling control unit 10 determines whether or not automatic driving is permitted by determining whether or not an abnormality that makes automatic driving not possible, such as an approach of an emergency vehicle, bad weather, a disaster, or a road abnormality (construction), is present. In addition, regarding the vehicle system that is the recognition and determination system and the traveling control system, the traveling control unit 10 determines whether or not automatic driving is permitted by determining whether or not an abnormality that makes automatic driving not possible is present. When determined that execution of the automatic driving mode is not permitted (NO at step S106), the traveling control unit 10 returns to step S104. Meanwhile, when determined that execution of the automatic driving mode is permitted (YES at step S106), the traveling control unit 10 proceeds to step S108.

At step S108, the traveling control unit 10 determines whether or not the automatic switching mode is designated in the automatic driving switching switch 30. When the automatic switching mode is designated (YES at step S108), the traveling control unit 10 proceeds to step S112. Meanwhile, when the automatic switching mode is not designated (NO at step S108), the traveling control unit 10 proceeds to step S110. At step S110, the traveling control unit 10 determines whether or not the automatic driving manual-on mode is designated in the automatic driving switching switch 30. When the automatic driving manual on-mode is not designated, that is, when the automatic driving manual-off mode is designated (NO at step S110), the traveling control unit 10 returns to step S104. Meanwhile, when the automatic driving manual-on mode is designated (YES at step S110), the traveling control unit 10 proceeds to step S112.

At step S112, the traveling control unit 10 notifies the driver of information indicating that a transition from the manual driving mode to the automatic driving mode will be made, via the notifying unit 28. Notification of the information indicating that the transition to the automatic driving mode will be made is given by display or audio output. At step S114, the traveling control unit 10 transitions to the automatic driving mode and starts the system in-charge automatic driving control. At this time, when an operation state of the driver meets a condition for transition to the automatic driving mode (such as none of a steering wheel operation, an accelerator operation, and a brake operation are inputted) based on the operating information inputted from the vehicle state input unit 16, the traveling control unit 10 completely switches to the automatic driving mode.

At step S116, the traveling control unit 10 acquires the various types of information related to the environment state, the system state, the vehicle state, and the driver state. Acquisition details regarding the information are similar to the step at step S104, described above. At step S118, the traveling control unit 10 determines whether or not the automatic switching mode is designated in the automatic driving switching switch 30. When the automatic switching mode is designated (YES at step S118), the traveling control unit 10 proceeds to step S122. Meanwhile, when the automatic switching mode is not designated (NO at step S118), the traveling control unit 10 proceeds to step S120.

At step S120, the traveling control unit 10 determines whether or not the automatic driving manual-on mode is designated in the automatic driving switching switch 30. When the automatic driving manual-on mode is not designated, that is, when the automatic driving manual-off mode is designated (NO at step S120), the traveling control unit 10 returns to step S102. The traveling control unit 10 turns on the manual driving mode and transitions to the driver in-charge operation mode. Meanwhile, when the automatic driving manual-on mode is designated (YES at step S120), the traveling control unit 10 proceeds to step S122.

At step S122, the traveling control unit 10 determines whether or not execution of the automatic driving mode is permitted, using the various types of information acquired at step S116 as the determination indexes. The specific determination method is similar to the step at step S106, described above. When determined that execution of the automatic driving mode is permitted (YES at step S122), the traveling control unit 10 returns to step S116. Meanwhile, when determined that execution of the automatic driving mode is not permitted (NO at step S122), the traveling control unit 10 proceeds to step S124.

At step S124, the traveling control unit 10 notifies the driver of information indicating that a transition from the automatic driving mode to the manual driving mode will be made. In addition, the traveling control unit 10 performs a wake-up operation on the driver as required. Specifically, the traveling control unit 10 controls the pedal drive unit 23, the steering wheel drive unit 24, the seat drive unit 25, the air-conditioner control unit 26, the audio control unit 27, and the notifying unit 20, either singly or in a combination of a plurality thereof, and thereby alerts the driver. For example, when the traveling control unit 10 determines the approach of an emergency vehicle, the traveling control unit 10 displays this circumstance on a display, or reduces the reproduction sound volume of the audio and outputs an audio message to alert the driver. In addition, when the traveling control unit 10 determines a state in which the degree of wakefulness of the driver is low (such as drowsiness or dozing), the traveling control unit 10 awakens the driver by vibrating the steering wheel or the seat. Should the driver not awaken even then, the traveling control unit 10 operates the brake for an instant, once or a plurality of times.

At step S126, the traveling control unit 10 determines whether or not an acceptance condition regarding the driver for transition to the manual driving mode is met. Specifically, the traveling control unit 10 determines that the acceptance condition is met under a condition that the driver has inputted an override operation, such as a steering wheel operation, an accelerator operation, a brake operation, or the like, for a driving operation based on automatic driving control. Alternatively, the traveling control unit 10 determines that the acceptance condition is met under a condition that a cancellation command for the automatic driving mode is received from the driver.

When the acceptance condition for transition to the manual driving mode is not met (NO at S126), the traveling control unit 10 proceeds to step S128. At step S128, the traveling control unit 10 determines whether or not a prescribed wait time over which to wait for the acceptance condition to be met has elapsed. When the prescribed wait time has not elapsed (NO at step S128), the traveling control unit 10 returns to step S124. Then, when determined that the acceptance condition for transition to the manual driving mode is met at step S126 (YES at step S126), the traveling control unit 10 returns to step S102. The traveling control unit 10 turns on the manual driving mode and transitions to the driver in-charge operation mode.

Meanwhile, when determined that the prescribed wait time has elapsed at step S128 (YES at step S128), the traveling control unit 10 proceeds to step S130. At step S130, the traveling control unit 10 performs emergency evacuation traveling in which the own vehicle is automatically evacuated to a safe location, or vehicle stop in which the own vehicle is stopped.

[Description Related to Changes in the State of the Automatic Driving Switching Switch]

Situation-specific changes in the state of the automatic driving switch 30 based on a designation state of each mode and an execution state of automatic driving will be described with reference to FIG. 4.

Figure 4:
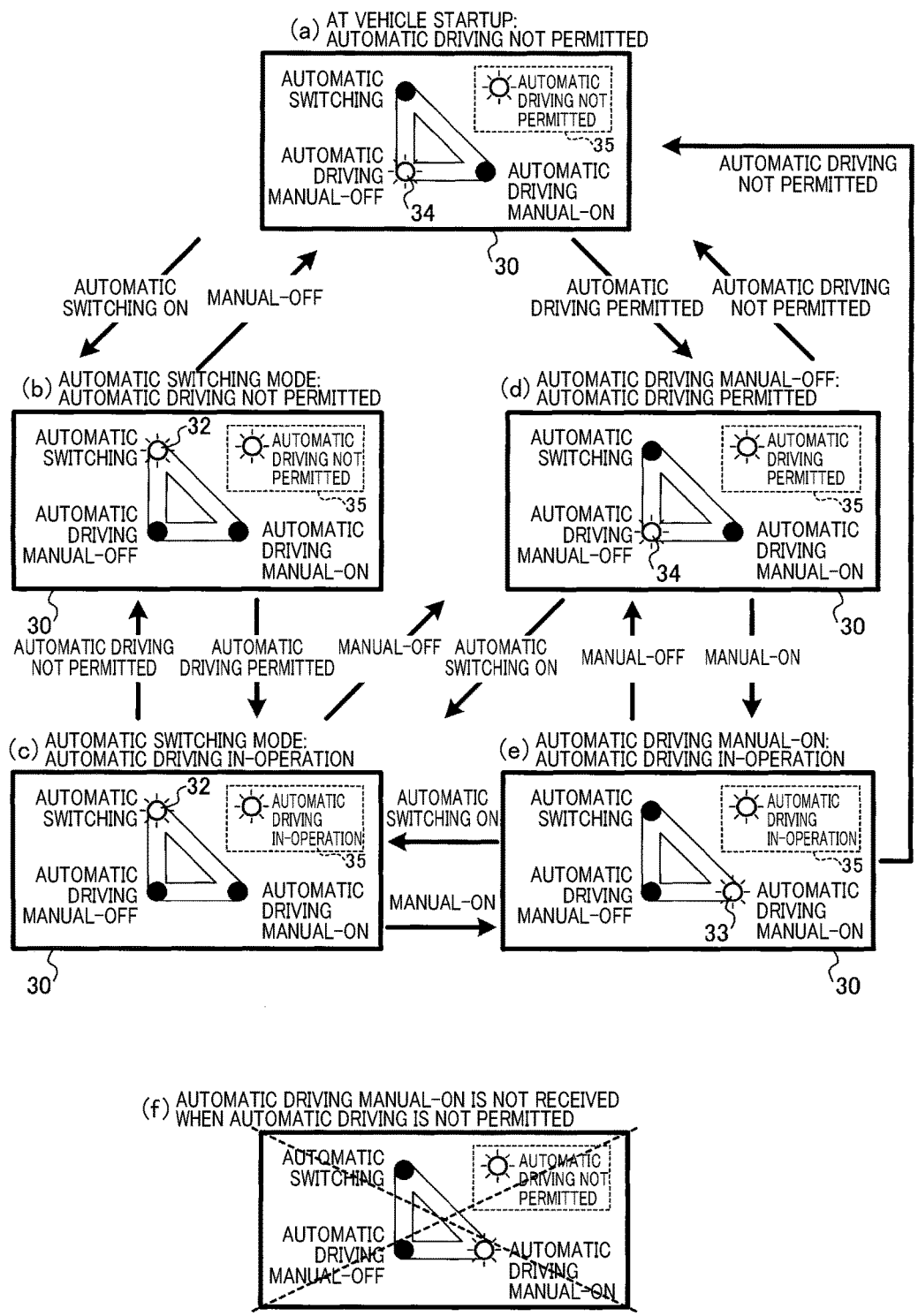
FIG. 4 is a state transition diagram showing changes in the state of the automatic driving switching switch in FIG. 2.

A case shown in FIG. 4 by (a) corresponds to an initial state of the automatic driving switching switch 30 immediately after startup of the vehicle. Immediately after startup of the vehicle, the traveling control unit 10 sets the automatic driving switching switch 30 to the automatic driving manual-off mode and illuminates the indicator switch 34. The traveling control unit 10 also displays the automatic driving not-permitted state in the state display area 35.

As a result of the automatic switching mode being designated in the state shown as an example in FIG. 4 by (a), the automatic driving switching switch 30 transitions to a state shown as an example in FIG. 4 by (b). In the case in FIG. 4 by (b), the indicator switch 32 corresponding to the automatic switching mode is illuminated. In addition, the automatic driving not-permitted state is displayed in the state display area 35. When the automatic driving manual-off mode is designated in the state shown as an example in FIG. 4 by (b), the automatic driving switching switch 30 transitions to the state shown as an example in FIG. 4 by (a).

Meanwhile, when the traveling control unit 10 determines that automatic driving is permitted in the state shown as an example in FIG. 4(b), the automatic driving switching switch 30 transitions to a state shown as an example in FIG. 4 by (c). At this time, the traveling control unit 10 switches from the manual driving mode to the automatic driving mode, in compliance with the automatic switching mode. In the case shown in FIG. 4 by (c), the indicator switch 32 corresponding to the automatic switching mode is illuminated. In addition, an automatic driving in-operation state is displayed in the state display area 35. When the traveling control unit 10 determines that automatic driving is not permitted in the state shown as an example in FIG. 4 by (c), the automatic driving switching switch 30 transitions to the state shown as an example in FIG. 4 by (b) and the traveling control unit 10 switches from the automatic driving mode to the manual driving mode.

Meanwhile, when the automatic driving manual-off mode is designated in the state shown as an example in FIG. 4 by (c), the automatic driving switching switch 30 transitions to a state shown as an example in FIG. 4 by (d). At this time, the traveling control unit 10 switches from the automatic driving mode to the manual driving mode in compliance with the automatic driving manual-off mode. In addition, when the traveling control unit 10 determines that automatic driving is permitted in the state shown as an example in FIG. 4 by (a), the automatic driving switching switch 30 transitions to the state shown as an example in FIG. 4 by (d). In the case in FIG. 4 by (d), the indicator switch 34 corresponding to the automatic driving manual-off mode is illuminated. In addition, the automatic driving permitted state is displayed in the state display area 35.

When the automatic switching mode is designated in the state shown as an example in FIG. 4 by (d), the automatic driving switching switch 30 transitions to the state shown as an example in FIG. 4 by (c), and the traveling control unit 10 switches from the manual driving mode to the automatic driving mode. In addition, when automatic driving is determined to not be permitted in the state shown as an example in FIG. 4 by (d), the automatic driving switching switch 30 transitions to the state shown as an example in FIG. 4 by (a).

Meanwhile, when the automatic driving manual-on mode is designated in the state shown as an example in FIG. 4 by (d), the automatic driving switching switch 30 transitions to a state shown as an example in FIG. 4 by (e). At this time, the traveling control unit 10 switches from the manual driving mode to the automatic driving mode in compliance with the automatic driving manual-on mode. In addition, when the automatic driving manual-on mode is designated in the state shown as an example in FIG. 4 by (d), the automatic driving switching switch 30 transitions to the state shown as an example in FIG. 4(e). In the case shown in FIG. 4 by (e), the indicator switch 33 corresponding to the automatic driving manual-on mode is illuminated. In addition, the automatic driving in-operation state is displayed in the state display area 35.

When the automatic switching mode is designated in the state shown as an example in FIG. 4 by (e), the automatic driving switching switch 30 transitions to the state shown as an example in FIG. 4 by (c). In addition, when the automatic driving manual-off mode is designated in the state shown as an example in FIG. 4 by (e), the automatic driving switching switch 30 transitions to the state shown as an example in FIG. 4 by (d), and the traveling control unit 10 switches from the automatic driving mode to the manual driving mode. Furthermore, when the traveling control unit 10 determines that automatic driving is not permitted in the state shown as an example in FIG. 4 by (e), the automatic driving switching switch 30 transitions to the state shown as an example in FIG. 4 by (a), and the traveling control unit 10 switches from the automatic driving mode to the manual driving mode.

As shown as an example in FIG. 4 by (0, the automatic driving switching switch 30 is configured such that, even should an operation to designate the automatic driving manual-on mode be inputted when the traveling control unit 10 has determined that automatic driving is not permitted, switching to the automatic driving manual-on mode is not performed. That is, the state shown as an example in FIG. 4 by (0 does not actually occur.

[Effects]

In the vehicle traveling control system 1 according to the embodiment, the following effects are achieved.

The driver can freely operate, through the automatic driving switching switch 30, the automatic driving manual-on/off mode in which switching between the manual driving mode and the automatic driving mode is performed based on an operation by the driver, and the automatic switching mode in which switching is automatically performed. In addition, in a state in which the traveling control unit 10 has determined that execution of automatic driving is not permitted, the operation for designating the automatic driving manual-on mode is not received. As a result, the automatic driving mode is prevented from being started in unsuitable circumstances. Consequently, in the system in which both the automatic driving manual-on/off mode and the automatic switching mode are provided, both safety and convenience of the driver can be actualized.

The automatic driving switching switch 30 has a configuration in which the mode selection state, and the in-operation, permitted, and not-permitted states of automatic driving are presented to the driver. As a result, the driver can easily determine the state of switching between the automatic driving mode and the manual driving mode. Consequently, for example, automatic driving can be performed as a result of the driver realizing that execution of automatic driving has become possible through an indicator lamp or audio, and operating the switch for the automatic driving manual-on mode.

When execution of automatic driving is determined to not be permitted during execution of the automatic driving mode, the traveling control unit 10 switches from the automatic driving mode to the manual driving mode under a condition that an override operation is detected or a cancellation command for the automatic driving mode is received from the driver. Consequently, authority can be safely transferred to the driver in a state in which the driver is prepared to accept switching to the manual driving mode.

When the traveling control unit 10 switches from the manual driving mode to the automatic driving mode, the driver can quickly achieve the operation state that is required for acceptance of the transition to the automatic driving mode as a result of the driver being notified of the information indicating the transition to the automatic driving mode in advance. In addition, as a result of the traveling control unit 10 switching to the automatic driving mode under a condition that the operation state of the driver meets the acceptance condition for the automatic driving mode, authority can be safely transferred to the system in a state in which the driver is prepared for acceptance.

VARIATION EXAMPLES

According to the above-described embodiment, an example in which the automatic driving switching switch 30 is mainly configured by the GUI is described. In addition, the automatic driving switching switch 30 may be configured by a combination of a mechanical switch that enables alternate switching among the three modes and an indicator that is capable of presenting the state related to automatic driving.

A configuration in which, when the traveling control unit 10 performs switching from the automatic driving mode to the manual driving mode, the proportion of driving operations carried out by automatic driving is gradually reduced during a period until the driving operations inputted by the driver converges into a safe range is also possible. In addition, a configuration in which control to automatically and gradually decelerate the own vehicle is performed when the traveling control unit 10 performs switching from the automatic driving mode to the manual driving mode is also possible.

According to the above-described embodiment, in the traveling control unit 10 of the vehicle traveling control system 1 that is the driving assistance control apparatus, the functions of the driving assistance control apparatus are actualized by a program being stored in the ROM that corresponds to a non-transitory tangible recording medium, and the CPU that corresponds to a processor of a computer running the program. However, a configuration in which the program is stored in a non-transitory tangible recording medium other than the ROM (such as a non-volatile memory other than the ROM) and a processor such as the CPU runs the program is also possible. In this case, a configuration in which, as a result of the processor running the program stored in the non-transitory tangible recording medium, a method (such as a driving assistance control method) corresponding to the program is performed in the traveling control unit 10 of the vehicle traveling control system 1 is also possible.

In addition, some or all of the functions provided by the vehicle traveling control system 1 that is the driving assistance control apparatus may be configured as hardware by a single or a plurality of integrated circuits (that is, ICs), or the like. Furthermore, each unit (such as the traveling control unit 10 that corresponds to the control unit and the determining unit of the driving assistance control apparatus) of the vehicle traveling control system 1 may be provided by software recorded in a non-transitory tangible recording medium, such as a non-volatile memory, and a computer that runs the software, by the software alone, by hardware alone, or by a combination thereof.

While the present disclosure has been described with reference to an embodiment thereof, it is to be understood that the disclosure is not limited to the embodiment and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

The invention claimed is:

1. A driving assistance control apparatus comprising:
    a control unit that alternately switches to an operation mode that is either of a driving assistance mode that is an operation mode in which driving assistance is performed, driving assistance being that in which a portion or all of driving operations related to traveling of an own vehicle is automatically performed, and a manual driving mode that is an operation mode in which traveling is performed based on a driving operation by a driver without driving assistance being performed; and
    a user interface unit that is configured to alternately designate, by input from the driver, an automatic switching mode in which switching between the driving assistance mode and the manual driving mode is autonomously performed, a manual-on mode in which the driving assistance mode is designated to be turned on by input from the driver, and a manual-off mode in which the driving assistance mode is designated to be turned off by input from the driver, wherein
    the control unit determines whether or not execution of driving assistance is permitted at a current time, based on a predetermined determination index related to whether or not execution of driving assistance is possible, with or without a designation of the automatic switching mode or the manual-on mode on the user interface unit,
    the control unit executes the driving assistance mode when the execution of driving assistance is permitted by the control unit and executes the manual driving mode when the execution of driving assistance is determined to not be permitted by the control unit, under a condition that the automatic switching mode is designated by the user interface unit,
    the control unit executes the driving assistance mode when a switch for designating the manual-on mode is operated by the user interface unit, under a condition that the execution of driving assistance is permitted by the control unit, and
    the user interface unit does not receive input that designates the manual-on mode when the execution of driving assistance is determined to not be permitted by the control unit, and receives input that designates the automatic switching mode even when the execution of driving assistance is determined to not be permitted by the control unit.

2. The driving assistance control apparatus according to claim 1, further comprising:
    the user interface unit presents, to the driver, a currently designated state of modes that are the automatic switching mode, the manual-on mode, and the manual-off mode in the user interface unit.

3. The driving assistance control unit apparatus according to claim 2, further comprising:
    the user interface unit presents, to the driver, a state indicating that driving assistance is being executed when the driving assistance mode is executed and presents, to the driver, a state regarding whether or not the execution of driving assistance is permitted when the driving assistance mode is not executed.

4. The driving assistance control apparatus according to claim 3, wherein:
    the control unit cancels the driving assistance mode and switches to the manual driving mode under a condition that an override operation by the driver for a driving operation based on driving assistance is detected or a cancellation command for the driving assistance mode is received from the driver, when the execution of driving assistance is determined to be not permitted by the control unit during execution of the driving assistance mode.

5. The driving assistance control apparatus according to claim 4, further comprising:
    an output apparatus, wherein
    the control unit uses the output apparatus to notify the user of information indicating transition to the driving assistance mode before switching, when the manual driving mode is switched to the automatic driving mode based on permission from the control unit, under a condition that the automatic switching mode is designated by the user interface unit.

6. The driving assistance control apparatus according to claim 5, wherein:
    the output apparatus notifies the driver of audio information or display information.

7. The driving assistance control apparatus according to claim 6, further comprising:
    a sensor that detects an operation state of the driver, wherein
    the control unit switches to the driving assistance mode under a condition that the operation state detected by the sensor meets an acceptance condition for acceptance of transition to the driving assistance mode, when the manual driving mode is switched to the driving assistance mode based on permission from the control unit, under a condition that the automatic switching mode is designated by the user interface unit.

8. The driving assistance control apparatus according to claim 1, further comprising:
    the user interface unit presents, to the driver, a state indicating that driving assistance is being executed when the driving assistance mode is executed and presents, to the driver, a state regarding whether or not the execution of driving assistance is permitted when the driving assistance mode is not executed.

9. The driving assistance control apparatus according to claim 1, wherein:
    the control unit cancels the driving assistance mode and switches to the manual driving mode under a condition that an override operation by the driver for a driving operation based on driving assistance is detected or a cancellation command for the driving assistance mode is received from the driver, when the execution of driving assistance is determined to be not permitted by the control unit during execution of the driving assistance mode.

10. The driving assistance control apparatus according to claim 1, further comprising:
    an output apparatus, wherein
    the control unit uses the output apparatus to notify the user of information indicating transition to the driving assistance mode before switching, when the manual driving mode is switched to the automatic driving mode based on permission from the control unit, under a condition that the automatic switching mode is designated by the user interface unit.

11. The driving assistance control apparatus according to claim 1, further comprising:
a sensor that detects an operation state of the driver, wherein
the control unit switches to the driving assistance mode under a condition that the operation state detected by the sensor meets an acceptance condition for acceptance of transition to the driving assistance mode, when the manual driving mode is switched to the driving assistance mode based on permission from the control unit, under a condition that the automatic switching mode is designated by the user interface unit.

* * * * *